(12) United States Patent
Yang et al.

(10) Patent No.: US 7,014,273 B1
(45) Date of Patent: Mar. 21, 2006

(54) SPOKED WHEEL SPINNER WITH NON-ROTATING CAP

(76) Inventors: Billy Yang, 18400 E. Gale Ave., City of Industry, CA (US) 91748; Mark J. Plumer, 18400 E. Gale Ave., City of Industry, CA (US) 91748

( * ) Notice: Subject to any disclaimer, the term of this patent is extended or adjusted under 35 U.S.C. 154(b) by 0 days.

(21) Appl. No.: 10/805,629

(22) Filed: Mar. 22, 2004

(51) Int. Cl.
*B60B 7/04* (2006.01)

(52) U.S. Cl. ............................. 301/37.25; 301/37.109

(58) Field of Classification Search .......... 301/37.101, 301/37.25, 37.26, 37.28, 37.106, 37.108, 301/37.109, 37.372, 37.376, 37.42; 40/587
See application file for complete search history.

(56) References Cited

U.S. PATENT DOCUMENTS

| | | | | | |
|---|---|---|---|---|---|
| 2,869,262 | A | * | 1/1959 | Lucas | 40/587 |
| 2,935,361 | A | * | 5/1960 | Aske | 301/37.25 |
| 2,997,344 | A | * | 8/1961 | Whiteman | 301/37.25 |
| 3,005,906 | A | * | 10/1961 | Butler, Jr. | 362/500 |
| 3,155,430 | A | * | 11/1964 | Schindler | 301/37.25 |
| 3,219,391 | A | * | 11/1965 | Hettinger | 301/37.25 |
| 6,045,195 | A | * | 4/2000 | Okamoto | 301/37.376 |
| 6,120,104 | A | * | 9/2000 | Okamoto et al. | 301/37.25 |
| 6,443,529 | B1 | * | 9/2002 | Williams | 301/37.25 |
| 6,517,167 | B1 | * | 2/2003 | Baker | 301/37.25 |
| 6,554,370 | B1 | * | 4/2003 | Fowlkes | 301/37.25 |
| 6,663,187 | B1 | * | 12/2003 | Fitzgerald | 301/37.25 |
| 6,848,751 | B1 | * | 2/2005 | Yuan | 301/37.25 |

* cited by examiner

*Primary Examiner*—Russell D. Stormer
*Assistant Examiner*—Jason R. Bellinger
(74) *Attorney, Agent, or Firm*—Albert O. Cota

(57) ABSTRACT

A spoked wheel spinner (20) that is used on an automotive wheel (22) that includes an adapter plate (24) that is mounted onto the automotive wheel (22) with a spinner bearing (26) retained within the adapter plate. A spinner shaft (30) is positioned onto the bearing with a bladed spinner (38) attached onto the spinner shaft. This arrangement permits the bladed spinner (38) to freely rotate independent of the automotive wheel. A cap bearing (50) is located on the spinner shaft (30) with a non-rotating cap (52) interfacing with the cap bearing. The non-rotating cap (52) includes a counter-weight (60) on the bottom edge so that when the automotive wheel (22) is rotating, the cap remains in a relatively fixed position without rotating. A cover (64) having indicia is attached to the cap permitting writing, symbols, designs and the like to be displayed.

14 Claims, 4 Drawing Sheets

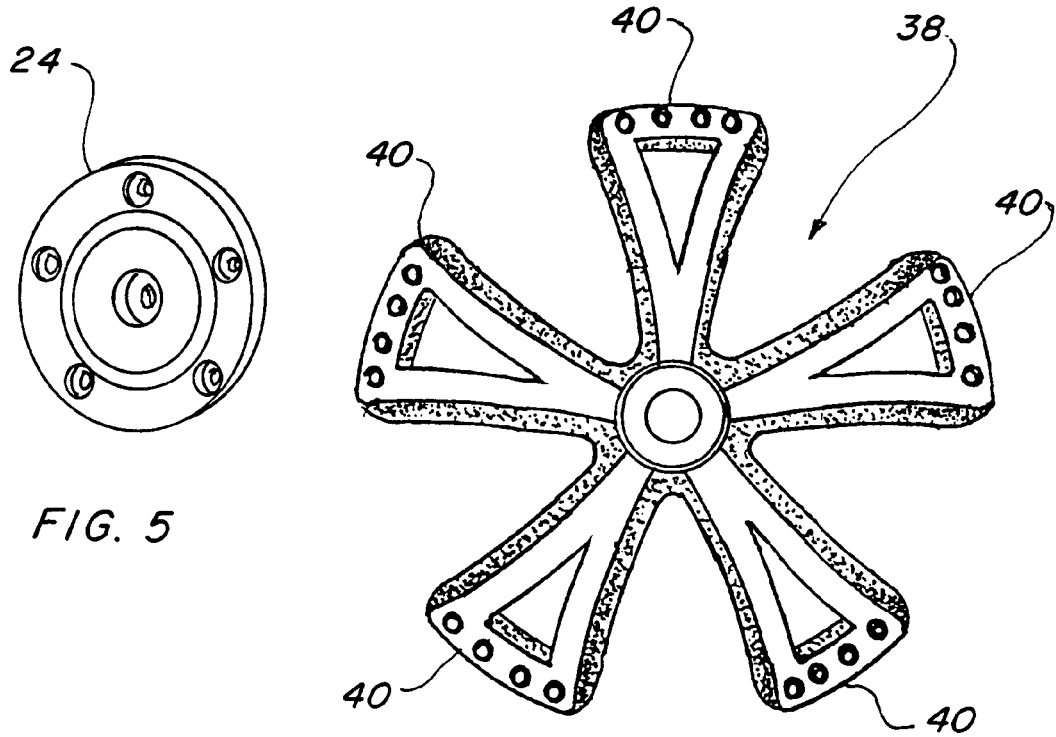
FIG. 5
FIG. 6
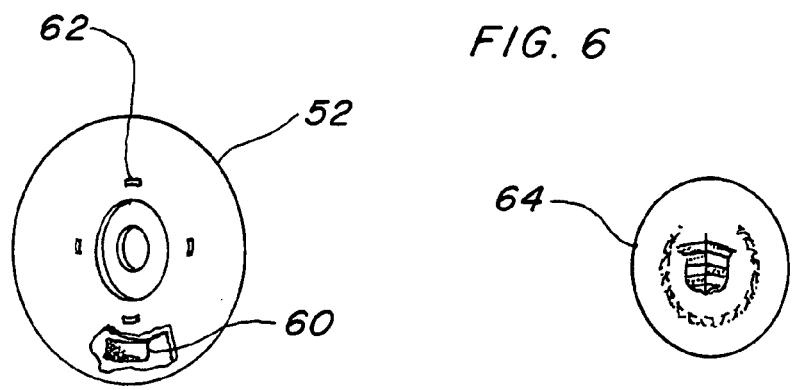
FIG. 7
FIG. 8
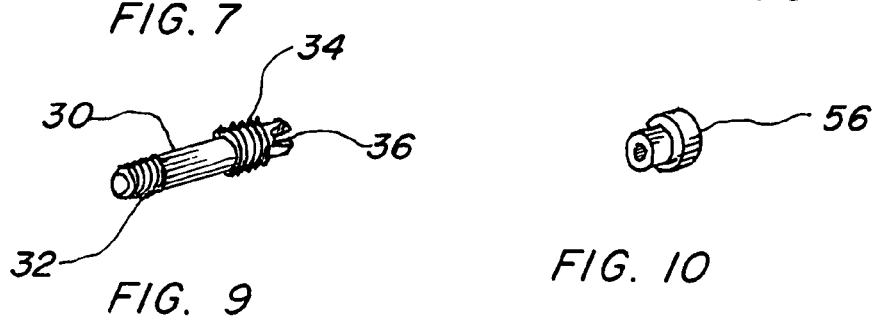
FIG. 9
FIG. 10

SPOKED WHEEL SPINNER WITH NON-ROTATING CAP

TECHNICAL FIELD

The invention generally pertains to wheel spoke spinners, and more specifically to a rotating spoked wheel spinner having a non-rotating cap that partially covers the rotating spinner.

BACKGROUND ART

Previously, wheel spinners have been used on vehicles such as automobiles, SUV's and trucks to provide a novel visual effect of a wheel spinning at different speeds than the wheel and to continue to spin when the vehicle has stopped.

A search of the prior art did not disclose any patents that read directly on the claims of the instant invention, however the following U.S. patents are considered related:

| U.S. Pat. No. | Inventor | Issue Date |
|---|---|---|
| 6,045,195 | Okamoto | Apr. 4, 2000 |
| 6,120,104 | Okamoto | Sep. 19, 2000 |
| 6,554,370 | Fowlkes | Apr. 29, 2003 |

Okamoto in U.S. Pat. No. 6,045,195 teaches a wheel cover with a fixable side fixture mounted to the center of a wheel of a vehicle to cover a central section. A movable side fixture is pivotally mounted to the central section of the fixable side through a bearing, and a wheel cover body in the shape of a disc prevents integral rotation with the vehicle wheel. A dynamo is mounted on the wheel cover that generates electrical current when the vehicle wheel is in motion.

U.S. Pat. No. 6,120,104 issued to Okamoto is for a wheel cover with a fixable side member mounted to the center of a wheel of a vehicle to cover a central section. A movable side member is pivotally mounted to the central section of the fixable side through a bearing and a wheel cover body in the shape of a disc prevents integral rotation with the vehicle wheel. The wheel cover body does not rotate with the vehicle wheel, thus permitting a design drawn onto the wheel cover body to be seen when the vehicle wheel is rotating.

Fowlkes in U.S. Pat. No. 6,554,370 discloses a wheel spinner assembly that is mounted onto the wheel of a vehicle. The invention has a wheel mount supported by the wheel and connected to a spinner mount with a bearing. A spinner is supported by the bearing, thereby permitting the spinner to rotate independently relative to the wheel when it is in motion.

DISCLOSURE OF THE INVENTION

The development of spoked wheel spinners is relatively new and has been limited to a single spinner attached to a vehicle wheel that rotates at a different speed than the wheel and continues to rotate when the vehicle stops.

Therefore, the primary object of the invention is to improve on this approach by adding a non-rotating cap in the center of the wheel that essentially stays immobile and provides an additional novel visual effect. The non-rotating cap is domed in shape and is positioned very close to the blades of the spinner, which adds to the attractiveness and distinction of the wheel. While the cap is almost motionless there are some moments that a slight movement is perceived, such as during sudden stops and starts, which may cause the cap to rotate slightly until a counter weight dampens the swinging movement. This movement is not objectionable however, as when the vehicle is moving, the movement is hardly perceived and yet it can also create a secondary novel visual effect.

An important object of the invention is the use of a cover having indicia that is located in the center of the cap. The cover is removable and permits a myriad of different indicia to be applied to its outer surface, such as names, symbols, scenes, slogans, designs, images or decorations. Unlike hub caps on conventional vehicle wheels, the cap with its cover is always in a readable position, even when the vehicle is moving which permits a passerby to see the indicia on the cover in the center of the wheel which is indeed unique to this improvement invention.

Another object of the invention permits the spoked spinner to function in the usual manner, which is that when the wheel rotates, the spinner rotates, but not necessarily at the same speed as the wheel, due to the friction of the bearings. When the vehicle stops, the spoked spinner continues to rotate for a few moments, imparted by the inertia of the mass, however the cap always stays relatively motionless or at least does not fully rotate.

Still another object of the invention is that the spoked spinner may be utilized with most common wheels in use on today's vehicles such as alloy wheels or conventional steel wheels having a myriad of different wheel covers.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 5 is a partial isometric view of the adapter plate of the preferred embodiment shown removed from the invention for clarity.

FIG. 6 is a partial isometric view of the bladed spinner of the preferred embodiment shown removed from the invention for clarity.

FIG. 7 is a partial isometric view of the non-rotating cap of the preferred embodiment with a section cut away to illustrate the counter-weight. The cap is shown removed from the invention for clarity.

FIG. 8 is a partial isometric view of the cover having indicia of the preferred embodiment shown removed from the invention for clarity.

FIG. 9 is a partial isometric view of the spinner shaft of the preferred embodiment shown removed from the invention for clarity.

FIG. 10 is a partial isometric view of the cap bearing retainer of the preferred embodiment shown removed from the invention for clarity.

BEST MODE FOR CARRYING OUT THE INVENTION

Figure 1:
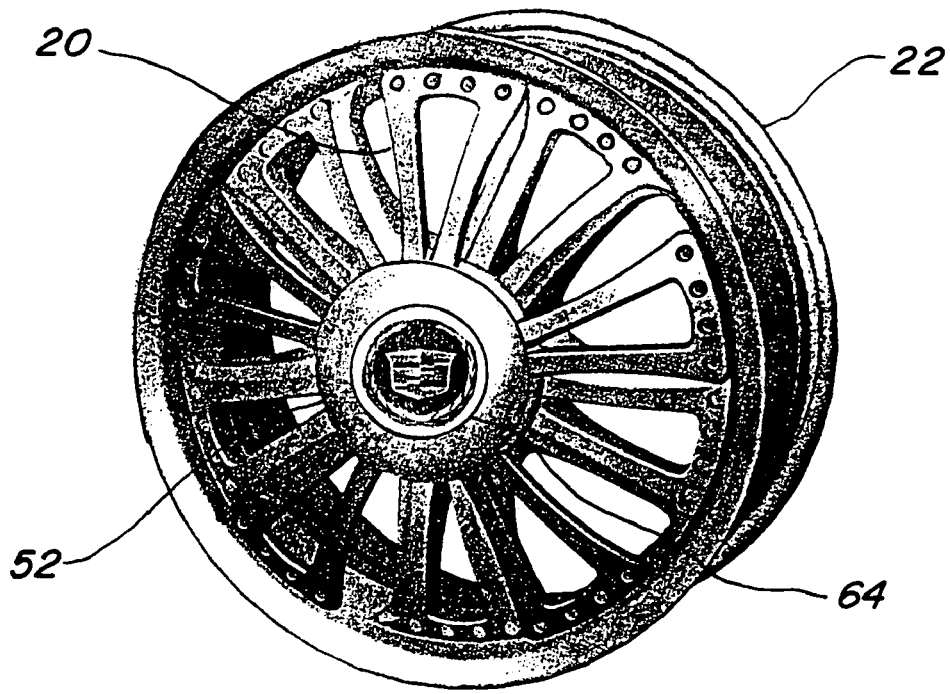
FIG. 1 is a partial isometric view of the preferred embodiment mounted on an automotive wheel.
Figures 2, 3:
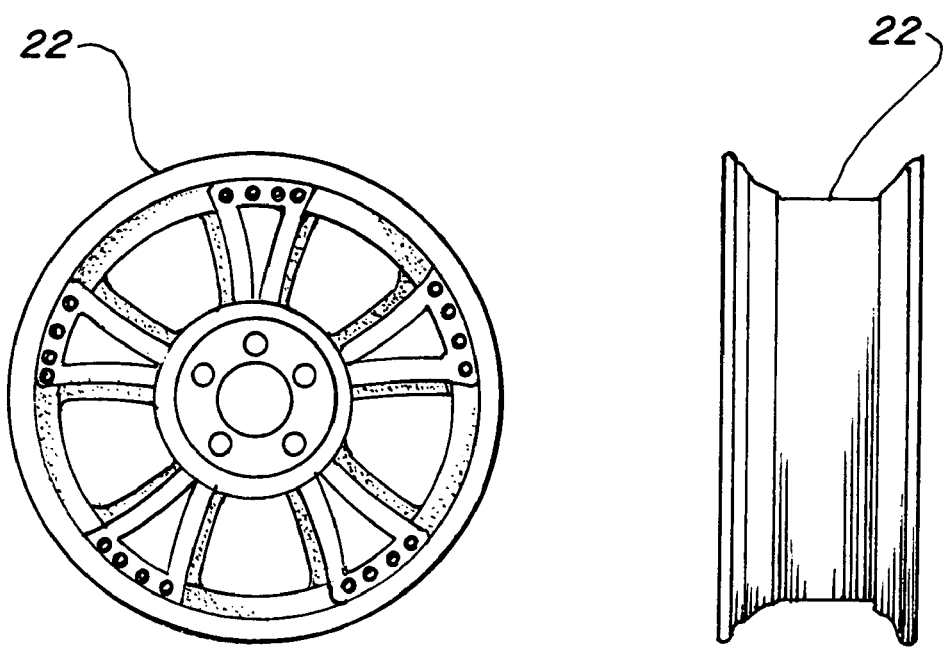
FIG. 2 is a front elevation view of a typical alloy automotive wheel to which the invention may be installed.
FIG. 3 a side elevation view of the automotive wheel as shown in FIG. 2.
Figure 4:
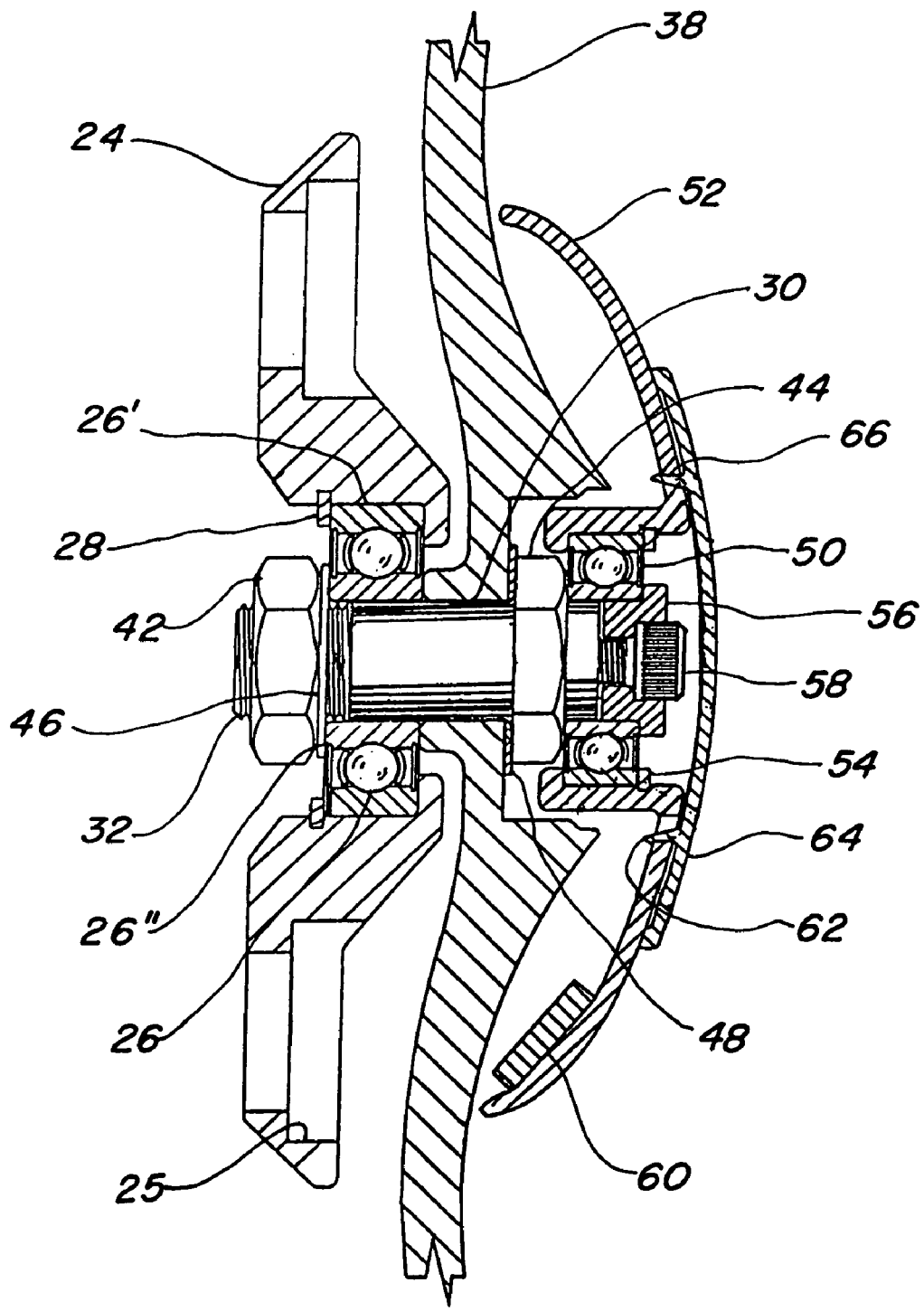
FIG. 4 is a cross-sectional view of the preferred embodiment taken along an arbitrary centerline.
Figure 11:
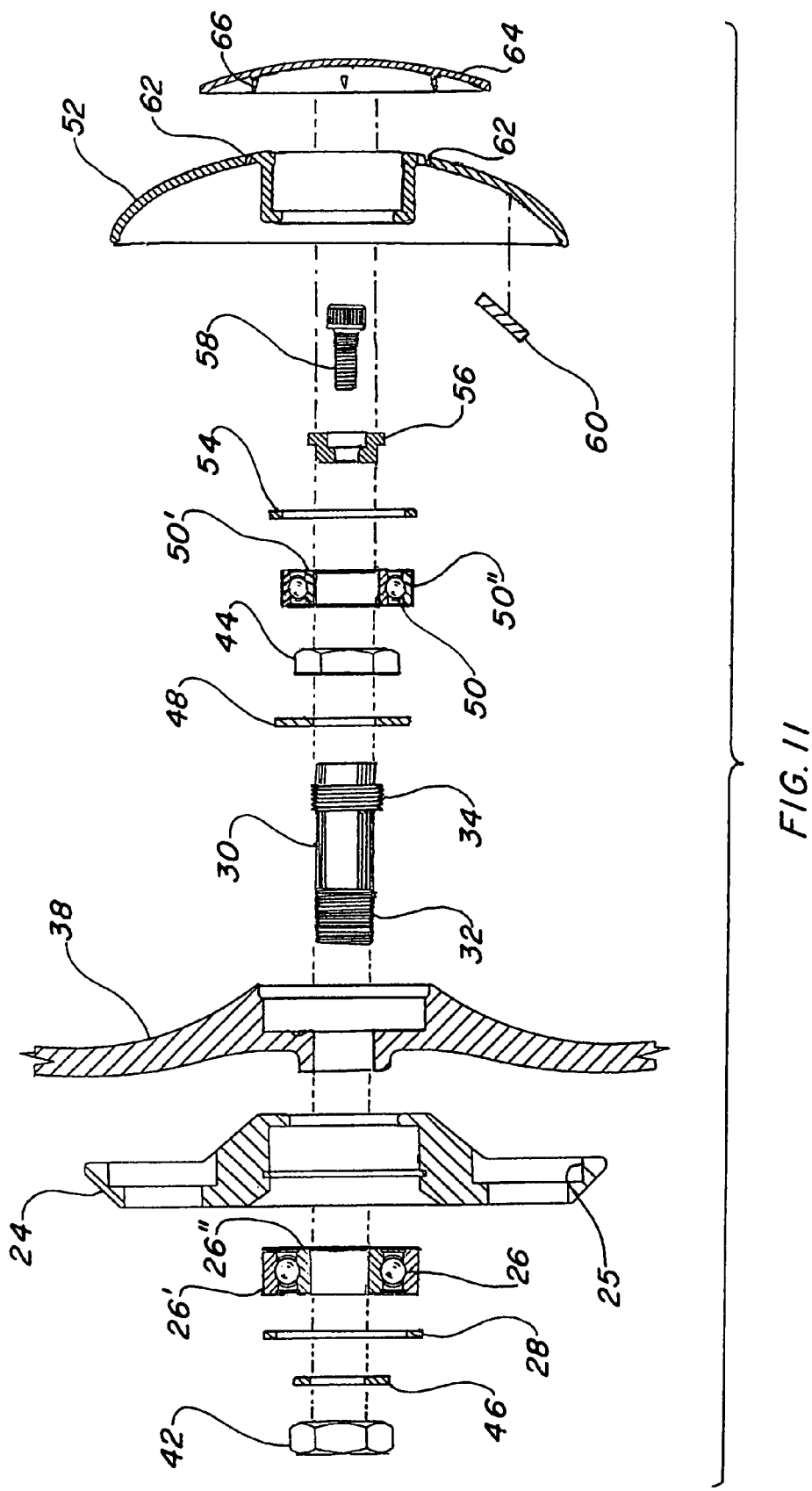
FIG. 11 is an exploded cross-section of the preferred embodiment.

The best mode for carrying out the invention for a spoked wheel spinner 20 for an automotive wheel 22 having a non-rotating cap is presented in terms of a preferred embodiment. This preferred embodiment, as shown in FIGS. 1 through 11, is comprised of an adapter plate 24 for mounting onto an automotive wheel. The adapter plate 24, as illustrated by itself in FIG. 5 and assembled invention in FIGS. 4 and 11, is round in shape with a plurality of countersunk holes 25 configured to accommodate automotive lug studs, which are basically standard in the automotive industry. The adapter plate 24 is preferably formed of a material such as die cast zinc, cast aluminum or cast iron, and may be machined to include the countersunk holes 25 on a conventional bolt circle. The adapter plate 24 is attached to the automotive wheel 22 with lug nuts, and the invention is easily adapted for use with either alloy wheels or steel wheels having wheel covers.

A spinner bearing 26 is pressed into, or similarly retained with a spinner bearing snap ring 28 within the adapter plate 24, as illustrated in FIG. 4. The spinner bearing 26 includes an outer race 26' and an inner race 26", and is preferably the ball bearing type, which is well known in the art and in common usage.

A spinner shaft 30 is retained within the bearing inner race 26" preferably with a pressed fit, as illustrated in FIG. 4. The shaft 30 is shown by itself in FIG. 9 and consists of a round rod with a first end having an external thread 32, a raised thread 34 in a middle portion, and a internal tapped hole 36 on a second end. The major portion of the shaft 30 protrudes outward from the spinner bearing 26, away from the automotive wheel 22.

A bladed spinner 38 is attached onto the spinner shaft 30 by either a press fit or a slip fit and interfaces with the inner race 26" of the spinner bearing 26, as illustrated in FIG. 4. The bladed spinner 38 preferably has an outer diameter that is essentially the same diameter as an inner surface of an automotive wheel rim to which the bladed spinner 38 is attached. This arrangement permits the bladed spinner to rotate freely, independent of the automotive wheel which creates a visually perceived aberration of different rotational speeds of the wheel 22.

The bladed spinner 38 is configured to include a number of separate blades 40 that form spokes, which are shaped to correspond with and enhance the configuration of the wheel 22. The bladed spinner 38 is depicted alone in FIG. 6 and as assembled in FIGS. 1, 2, 4 and 11. It should be noted that the configuration depicted in the drawings is only representative, as other shapes and styles may be easily used with simplicity and dispatch. The bladed spinner 38 may be formed of a material such as cast aluminum, thermoplastic, fiberglass, carbon fiber or the like. In order to retain the bladed spinner 38 on the shaft 30, a shaft nut 42 with a shaft washer 46 is threadably disposed on the external thread 32 on the first end of the spinner shaft 30. A spinner jam nut 44 with a spinner washer 48 is attached to the raised threads 34 in a middle portion of the spinner shaft 30 in order to compress the bladed spinner 38 against the inner race 26" of the spinner bearing 26, as shown pictorially in FIG. 4.

A ball bearing type cap bearing 50, having an outer race 50' and an inner race 50", is attached to a non-rotating cap 52 with a cap bearing snap ring 54 intersecting with the outer race 50'. The cap bearing inner race 50" is positioned on the second, or protruding end, of the spinner shaft 30. A cap bearing retainer 56 contiguously engages the second end of the shaft 30 that also interfaces with the inner race 50" of the cap bearing 50, with a cap bearing retainer screw 58 holding the cap 52 firmly in place.

The non-rotating cap 52 includes a counter-weight 60 on a bottom inner surface, such that when the automotive wheel 22 is rotating, the cap 52 remains in a relatively fixed position without movement as the counter-weight 60 on the bottom surface essentially prevents the cap 52 from rotating. The cap 52 preferably has a domed, semi-elliptical shape with a distal edge located adjacent to the bladed spinner 38, and includes a plurality of apertures 62 for attachment purposes.

A cover 64 having indicia is attached to the cap 52 through apertures 62 such that the cover 64 may be easily removed and replaced. The cover 64 has the same shape as the cap 52 except that it is smaller in diameter and has tabs 66 on the inner surface that engage the apertures 62 to hold the cover 64 tightly against the cap 52, as shown in FIG. 4. The cover 64 may have any type of indicia such as names, symbols, scenes, slogans, designs, images and decorations.

Once the spoked wheel spinner 20 is installed on the wheel, the operation is automatic, when the wheel 22 rotates with the vehicle moving, the spinner rotates but not necessarily at the same speed as the wheel due to the friction of the spinner bearings 26 and the cap bearing 50. When the vehicle stops, the bladed spinner 38 continues to rotate for a few moments due to the inertia of the mass, however the cap 52 always stays almost motionless or at least does not fully rotate.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A spoked spinner for an automotive wheel having a non-rotating cap comprising:
   a) an adapter plate for mounting onto the automotive wheel,
   b) a spinner bearing having an outer race and an inner race, wherein said spinner bearing outer race is retained within said adapter plate,
   c) a spinner shaft retained within said bearing inner race,
   d) a bladed spinner attached to said spinner shaft, said bladed spinner having an outer diameter essentially the same diameter as an adjacent inner surface of an automotive wheel rim, wherein said bladed spinner is free to rotate independently, relative to the automotive wheel which creates a visually perceived aberration that is caused by the different rotational speeds of the wheel and spinner,
   e) a cap bearing having an outer race and an inner race, wherein said cap bearing inner race is retained on said spinner shaft, and
   f) the non-rotating cap retained onto the cap bearing outer race, with the cap having a counter-weight on a bottom inner surface such that when the automotive wheel is rotating, the cap remains in a relatively fixed position without rotating as the counter-weight on the bottom surface essentially prevents the cap from rotating.

2. The spoked spinner as recited in claim 1 wherein said adapter plate having a plurality of countersunk holes for accommodating automotive lug studs.

3. The spoked spinner as recited in claim 1 wherein said adapter plate is formed of a material selected from the group consisting of die cast zinc, cast aluminum and cast iron.

4. The spoked spinner as recited in claim 1 wherein said spinner bearing comprises a ball bearing type.

5. The spoked spinner as recited in claim 1 wherein said spinner shaft further comprising a shaft nut threadably disposed on a first end of said spinner shaft to retain the spinner bearing in place, a spinner jam nut in a middle portion of said spinner shaft compressing said bladed spinner against the inner race of said spinner bearing, a cap bearing retainer contiguously engaging a second end of said shaft interfacing with said inner race of said cap bearing with a cap bearing retainer screw engaging the cap bearing retainer, for holding the non-rotating cap firmly in place and permitting the bladed spinner to freely rotate.

6. The spoked spinner as recited in claim 1 wherein said bladed spinner further comprises a plurality of separate blades forming spokes, which are shaped to correspond with and enhance the configuration of the vehicle wheel.

7. The spoked spinner as recited in claim 1 wherein said bladed spinner is formed of a material selected from the group consisting of cast aluminum, thermoplastic, fiberglass and carbon fiber.

8. A spoked spinner for an automotive wheel having a non-rotating cap comprising:
   a) an adapter plate for mounting onto the automotive wheel,
   b) a spinner bearing having an outer race and an inner race, wherein said spinner bearing outer race is retained within said adapter plate,
   c) a spinner shaft retained within said bearing inner race,
   d) a bladed spinner attached to said spinner shaft, said bladed spinner having an outer diameter essentially the same diameter as an adjacent inner surface of an automotive wheel rim, wherein said bladed spinner is free to rotate independently, relative to the automotive wheel which creates a visually perceived aberration that is caused by the different rotational speeds of the wheel and spinner, wherein said bladed spinner is balanced to allow said bladed spinner to rotate at a speed different than that of the automotive wheel to which the spoked spinner is attached,
   e) a cap bearing having an outer race and an inner race, wherein said cap bearing inner race is retained on said spinner shaft, and
   f) a non-rotating cap retained onto the cap bearing outer race, with the cap having a counter-weight on a bottom inner surface such that when the automotive wheel is rotating, the cap remains in a relatively fixed position without rotating as the counter-weight on the bottom surface essentially prevents the cap from rotating.

9. The spoked spinner as recited in claim 1 wherein said cap bearing comprises a ball bearing type.

10. The spoked spinner as recited in claim 1 wherein said non-rotating cap further comprising a configuration having a domed, semi-elliptical shape with a distal edge located closely adjacent to said bladed spinner.

11. The spoked spinner as recited in claim 1 wherein said non-rotating cap further having a plurality of apertures for attachment purposes.

12. The spoked spinner as recited in claim 11 wherein said non-rotating cap further comprises a cover having indicia that is attached to said motionless cap through said apertures such that the indicia cover may be removed and replaced.

13. The spoked spinner as recited in claim 1 wherein said cover further comprising a type of indicia selected from the group consisting of names, symbols, scenes, slogans, designs, images and decorations.

14. A spoked spinner for an automotive wheel having a non-rotating cap comprising:
   a) an adapter plate for mounting onto the automotive wheel,
   b) a spinner bearing retained within said adapter plate,
   c) a spinner shaft retained within said bearing,
   d) a bladed spinner attached to said spinner shaft, wherein said bladed spinner is free to rotate independently, relative to the automotive wheel,
   e) a cap bearing on said spinner shaft, and
   f) the non-rotating cap retained on the cap bearing with the cap having a counter-weight such that when the automotive wheel is rotating, the cap remains in a relatively fixed position without rotating.

* * * * *